(12) United States Patent
Drange

(10) Patent No.: US 8,594,962 B2
(45) Date of Patent: Nov. 26, 2013

(54) DISTRIBUTING A CLOCK IN A SUBTERRANEAN SURVEY DATA ACQUISITION SYSTEM

(75) Inventor: Geir A. M. Drange, Asker (NO)

(73) Assignee: WesternGeco L.L.C., Houston, TX (US)

( * ) Notice: Subject to any disclaimer, the term of this patent is extended or adjusted under 35 U.S.C. 154(b) by 469 days.

(21) Appl. No.: 12/473,385

(22) Filed: May 28, 2009

(65) Prior Publication Data

US 2010/0305895 A1     Dec. 2, 2010

(51) Int. Cl.
*G01R 29/02* (2006.01)

(52) U.S. Cl.
USPC .......... 702/79; 702/14; 702/69; 702/89; 702/125; 702/187; 370/503; 370/509; 370/516; 367/50; 367/51

(58) Field of Classification Search
USPC .......... 702/79, 57, 89, 14, 46, 69, 78, 125, 702/176, 187, 194; 370/503, 509, 516; 367/50, 51
See application file for complete search history.

(56) References Cited

U.S. PATENT DOCUMENTS

| | | | |
|---|---|---|---|
| 5,535,251 A | 7/1996 | Sugawara | |
| 6,009,530 A | 12/1999 | Goatly | |
| 6,769,029 B1 * | 7/2004 | Seki et al. | 709/232 |
| 7,447,238 B2 | 11/2008 | Drange | |
| 2003/0048811 A1 * | 3/2003 | Robie et al. | 370/509 |
| 2006/0155758 A1 * | 7/2006 | Arnegaard et al. | 707/103 X |
| 2007/0253289 A1 | 11/2007 | Chamberlain et al. | |
| 2008/0186906 A1 | 8/2008 | Defrance et al. | |
| 2008/0219094 A1 * | 9/2008 | Barakat | 367/21 |
| 2009/0147806 A1 * | 6/2009 | Brueckheimer | 370/503 |

OTHER PUBLICATIONS

Mohl, IEEE 1588—Precise Time Synchronization as the Basis for Real Time Applications in Automation, 2003 Industrial networking Solutions.
PCT Search Report, dated Jan. 25, 2011, Application No. PCT/US2010/036465.

* cited by examiner

*Primary Examiner* — Alexander H Taningco
*Assistant Examiner* — Paul D Lee

(57) ABSTRACT

A technique includes determining a first difference between a time that a first network element of a seismic acquisition network receives a first frame pulse from a second network element of the seismic acquisition network and a time that the first network element transmits a second frame pulse to the second network element. The technique includes determining a second difference between a time that the second network element receives the second frame pulse and a time that the second network element transmits the first frame pulse. The technique includes determining a transmission delay between the first and second network elements based on the first and second time differences.

23 Claims, 4 Drawing Sheets

DISTRIBUTING A CLOCK IN A SUBTERRANEAN SURVEY DATA ACQUISITION SYSTEM

BACKGROUND

The invention generally relates to distributing a clock in a subterranean survey data acquisition system.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes determining a first difference between a time that a first network element of a subterranean survey data acquisition network receives a first frame pulse from a second network element of the network and a time that the first network element transmits a second frame pulse to the second network element. The technique includes determining a second difference between a time that the second network element receives the second frame pulse and a time that the second network element transmits the first frame pulse. A transmission delay between the first and second network elements is determined based at least in part on the first and second time differences, and a clock is distributed in the network based at least in part on the determined transmission delay.

In another embodiment of the invention, an apparatus includes a subterranean survey data acquisition network that includes a first network element and a second network element. The first network element is adapted to determine a first difference between a time that the first network element receives a first frame pulse from the second network element and a time that the first network element transmits a second frame pulse to the second network element, and the first network element is adapted to communicate an indication of the first difference to the second network element. The second network element is adapted to determine a second difference between a time that the second network element receives the second frame pulse and a time that the second network element transmits the first frame pulse. The second network element is adapted to, based at least in part on the second difference and the indication of the first difference communicated from the first network element, determine a transmission delay between the first and second network elements, and adjust a distributed clock value based at least in part on the determined transmission delay.

Advantages and other features of the invention will become apparent from the following drawing, description and claims.

DETAILED DESCRIPTION

Figure 1:
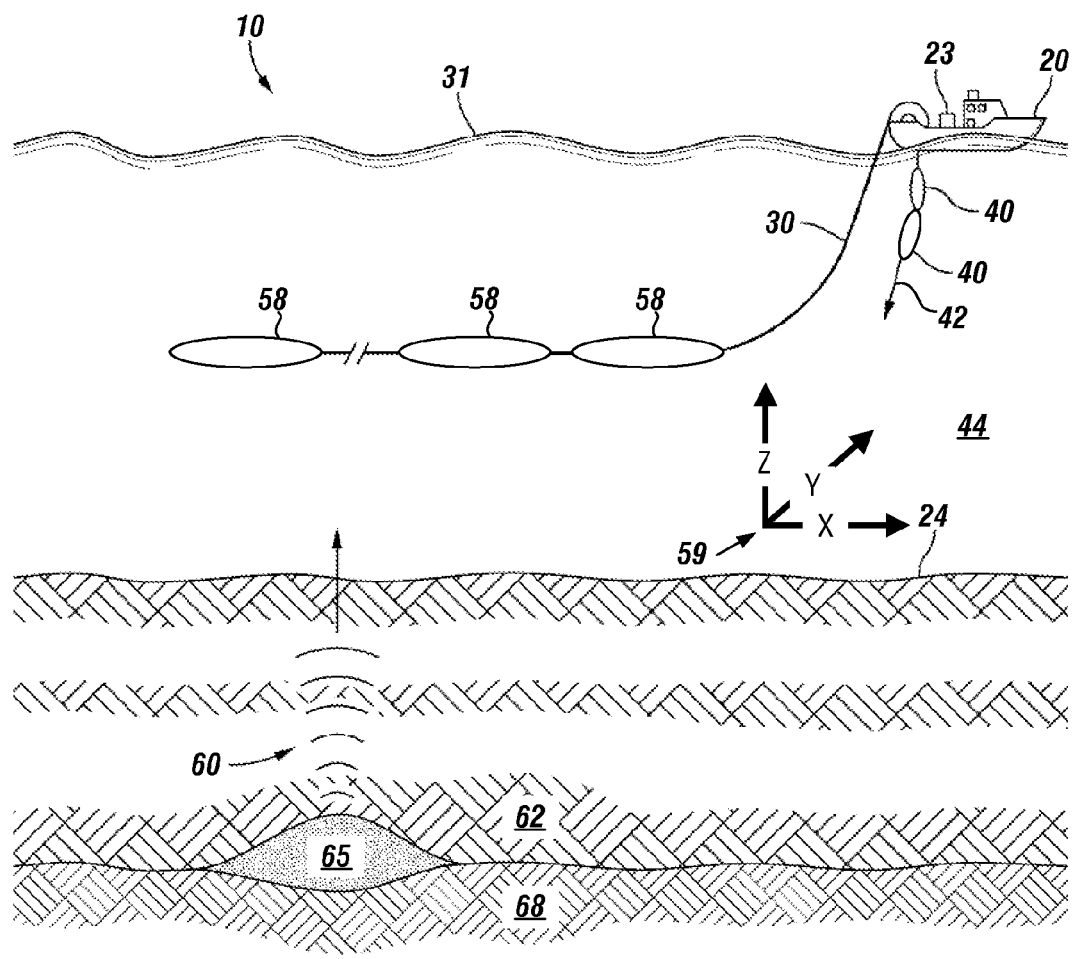
FIG. 1 is a schematic diagram of a seismic data acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensors 58, which may be, depending on the particular embodiment of the invention, hydrophones (as one non-limiting example) to acquire pressure data or multi-component sensors. For embodiments of the invention in which the sensors 58 are multi-component sensors (as another non-limiting example), each sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device (as depicted in FIG. 1) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor 58 may provide a trace, which corresponds to a measure of a pressure wavefield by its hydrophone 55; and the sensor 58 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system that may be, for example, located on land or on the vessel 20. Thus, many variations are possible and are within the scope of the appended claims.

Figure 2:
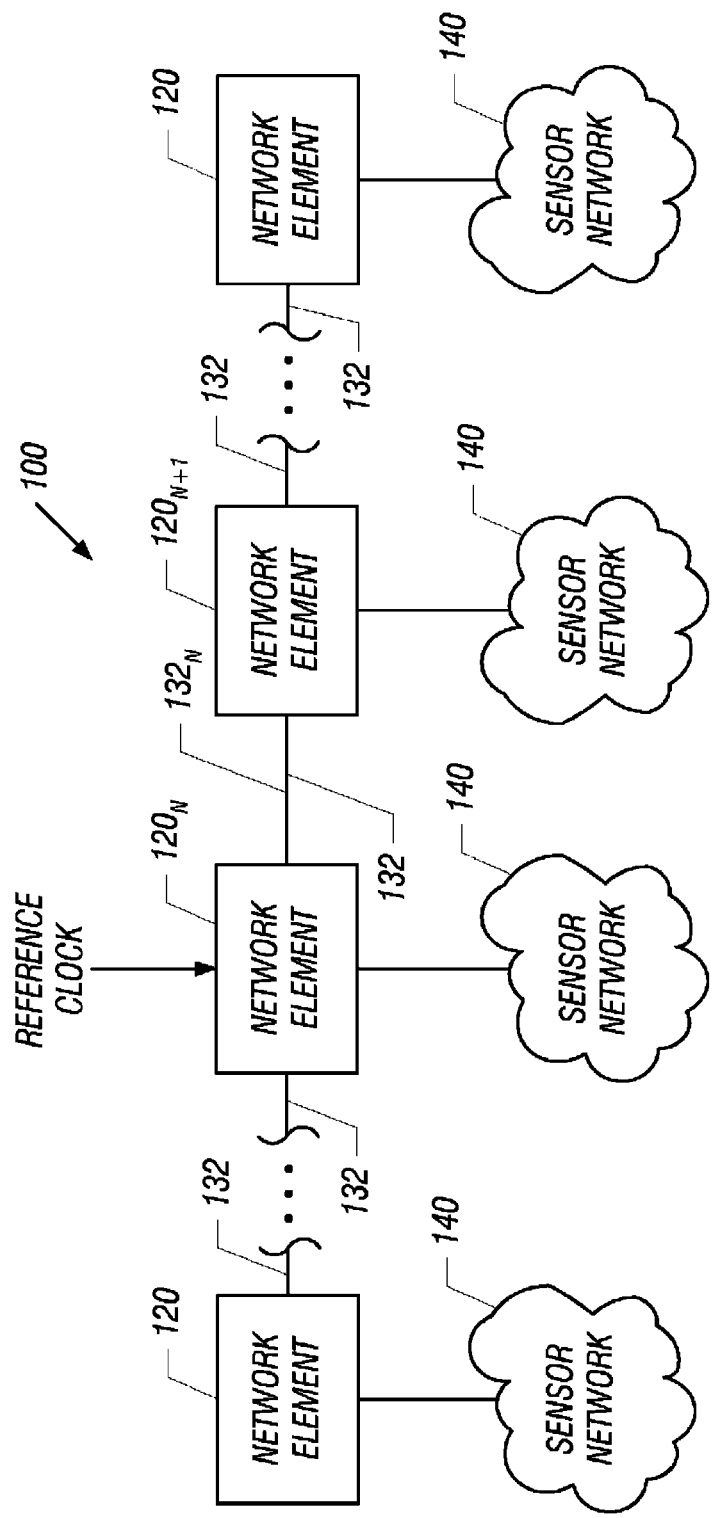
FIG. 2 is a schematic diagram of a network of the system of FIG. 1 according to an embodiment of the invention.

Referring to FIG. 2, in accordance with some embodiments of the invention, each streamer 30 includes a seismic data acquisition network, such as the exemplary seismic data acquisition network 100 that is depicted in FIG. 2. Referring to FIG. 2, the network 100 includes network nodes, or elements 120, which are connected together by transmission cable segments 132. As an example, in accordance with some embodiments of the invention, each cable segment 132 may be a fiber optic-based segment, and the network elements 120 may be part of an optical network that employs synchronized communications, such as a synchronous optical network (SONET) or a Synchronous Digital Hierarchy (SDH) network, as non-limiting examples. As depicted in FIG. 2, each network element 120 may be in communication with an associated seismic sensor network 140. As its name implies, each sensor network 140 may include various seismic sensors (particle motion sensors, hydrophones, etc.), which acquire seismic measurements that are communicated by the network elements 120 via the optical network to the surface vessel 20 (see FIG. 1).

A real time clock (RTC) is distributed among the network elements 120 for such purposes of timestamping seismic measurements, synchronizing network communications, etc. Not all of the network elements 120, however, are in proximity to an RTC source. Therefore, the network elements 120 that are not in proximity to an RTC source receive a value of the RTC that is sampled and transmitted from another network element 120 that is in proximity to an RTC source. For the example that is depicted in FIG. 2, the network element $120_N$ is in proximity to an RTC source and thus, directly receives an RTC reference clock signal. However, the network element $120_{N+1}$ does not directly receive an RTC reference clock signal but instead receives a sampled RTC clock value from the network element $120_N$ and uses this value to synchronize its local RTC clock, as further described below.

The transmission of a signal from one network element 120 to the next does not occur instantaneously, but rather, there is an inherent transmission delay, i.e., a delay from the time that one network element 120 provides a signal to one end of a cable segment 132 to the time that the network element 120 on the other end of the cable segment 132 receives the signal. In accordance with embodiments of the invention, the network elements 120 measure and taken into account the transmission delays for purposes of synchronizing the local clocks of the elements 120. By using this approach, the RTC may be distributed to the network elements 120 that are not in proximity to RTC sources, while preserving clock synchronization. For the example that is depicted in FIG. 2, the network element $120_N$ may sample the RTC concurrently with a frame pulse and communicate the sampled RTC value in the corresponding frame to the network element $120_{N+1}$. If the network element $120_{N+1}$ adjusts its local clock merely based on the time of the frame pulse and the sampled RTC value without taking the transmission delay into account, then the local clock of the network element $120_{N+1}$ will be out of synchronization with the local clock of the network element $120_N$ by a time equal to the transmission delay.

As described herein, the network elements 120 cooperate to distribute a reference clock among the elements 120 while preserving clock synchronization. To accomplish this goal, the network elements 120 measure components of the transmission delays over the transmission cable segments 132, combine the measured components to determine the transmission delays, and use the determined transmission delays to compensate distributed clock values.

A specific example is set forth below to illustrate the distribution of a clock value to the network element $120_{N+1}$ and the synchronization of this clock value. In this example, the network element $120_N$ samples its RTC source and transmits the following to the network element $120_{N+1}$: the sampled clock value; and a frame pulse that indicates when the clock value was sampled. As described below, the network element $120_{N+1}$ determines the corresponding transmission delay. By knowing the transmission delay and when the frame pulse was received, the network element $120_{N+1}$ is able to adjust the received sampled clock value to synchronize its clock to the clock of the network element $120_N$.

The clock is distributed to other network elements 120 and synchronized in a similar manner. For example, the network element $120_{N+2}$ (not shown in FIG. 2) may receive a clock value from network element $120_{N+1}$ (compensated by the network element $120_{N+1}$ as set forth above) and compensate the received clock value based on a determined transmission delay between the network elements $120_{N+1}$ and $120_{N+2}$.

Figure 3:
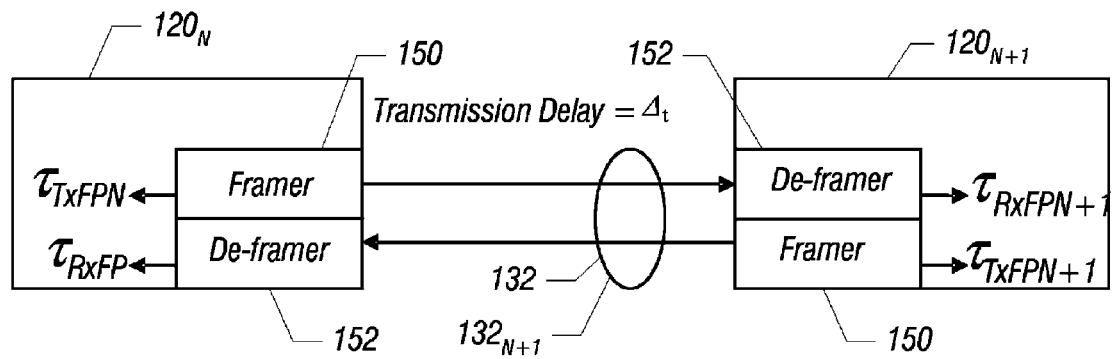
FIG. 3 is a schematic diagram illustrating a transmission delay measurement according to an embodiment of the invention.

FIG. 3 illustrates a technique to determine a transmission delay between the network elements $120_N$ and $120_{N+1}$ according to an embodiment of the invention. For this example, the network elements 120 communicate using a frame-based transmission protocol, such as a SONET or SDH-based protocol that has a predefined frame rate (8 kilohertz (kHz) as a non-limiting example), which is independent of the data rate. For a transmission from the network element $120_N$ to the network element $120_{N+1}$, a framer 150 of the network element $120_N$ transmits a frame pulse over the cable segment $132_N$ at time $\tau_{T \times FP(N)}$. Due to a transmission delay (called "$\Delta_t$" herein), the frame pulse arrives at a de-framer 152 of the network element $120_{N+1}$ at a later time $\tau_{R \times FP(N+1)}$. Thus, the relationship between the transmission and arrival times of the frame pulse may be described as follows:

$$\tau_{T \times FP(N)} + \Delta_t = \tau_{R \times FP(N+1)}. \qquad \text{Eq. 1}$$

Similarly, for a transmission from the network element $120_{N+1}$ to the network element $120_N$, a framer 150 of the network element $120_{N+1}$ transmits a frame, whose frame pulse is transmitted at time $\tau_{T \times FP(N+1)}$. Because the transmission delay $\Delta_t$ is assumed to be the same in both directions, the time ($\tau_{R \times FP(N)}$) at which the frame pulse arrives at the de-framer 152 of the network element $120_N$ may be described as follows:

$$\tau_{T \times FP(N+1)} + \Delta_t = \tau_{R \times FP(N)}. \qquad \text{Eq. 2}$$

As illustrated in FIG. 3, the network element $120_N$ has knowledge of the $\tau_{T \times FP(N)}$ and $\tau_{R \times FP(N)}$ times; and the network element $120_{N+1}$ has knowledge of the $\tau_{R \times FP(N+1)}$ and $\tau_{T \times FP(N+1)}$ times.

Based on these times, the network element $120_N$ may determine a difference between the time at which the frame pulse from the network element $120_{N+1}$ arrives and the time at which the frame pulse is transmitted by the network element $120_N$ to derive a quantity (called "$\Delta_{ta}$" herein) that is set forth below:

$$\Delta_{ta} = \tau_{R \times FP(N)} - \tau_{T \times FP(N)}. \qquad \text{Eq. 3}$$

Similarly, the network element $120_{N+1}$ may determine a difference between the time at which the frame pulse is received from the network element $120_N$ and time at which the frame pulse is transmitted by the network element $120_N$ to derive a quantity (called "$\Delta_{tb}$" herein) that is set forth below:

$$\Delta_{tb} = \tau_{R \times FP(N+1)} - \tau_{T \times FP(N+1)} \qquad \text{Eq. 4}$$

By combining Eqs. 3 and 4, the transmission delay $\Delta_t$ may be determined from the $\Delta_{ta}$ and $\Delta_{tb}$ quantities as follows:

$$\Delta_t = \frac{1}{2}(\Delta_{ta} + \Delta_{tb}). \qquad \text{Eq. 5}$$

Thus, the network element $120_{N+1}$ may determine the transmission delay $\Delta_t$ upon receipt of the quantity $\Delta_{ta}$ from the network element $120_N$. Likewise, the network element $120_N$ may determine the transmission delay $\Delta_t$ upon receipt of the quantity $\Delta_{tb}$ from the network element $120_{N+1}$.

Therefore, in general, any network element 120 may determine a transmission delay $\Delta_t$ between the element 120 and its closest neighbor by receiving the corresponding $\Delta_{ta}$ or $\Delta_{tb}$ information from its neighbor. After determination of the transmission delay $\Delta_t$, the network element 120 may then adjust a received clock value from its neighbor for purposes of accounting for the transmission delay $\Delta_t$ and properly synchronizing its local clock.

Figure 4:
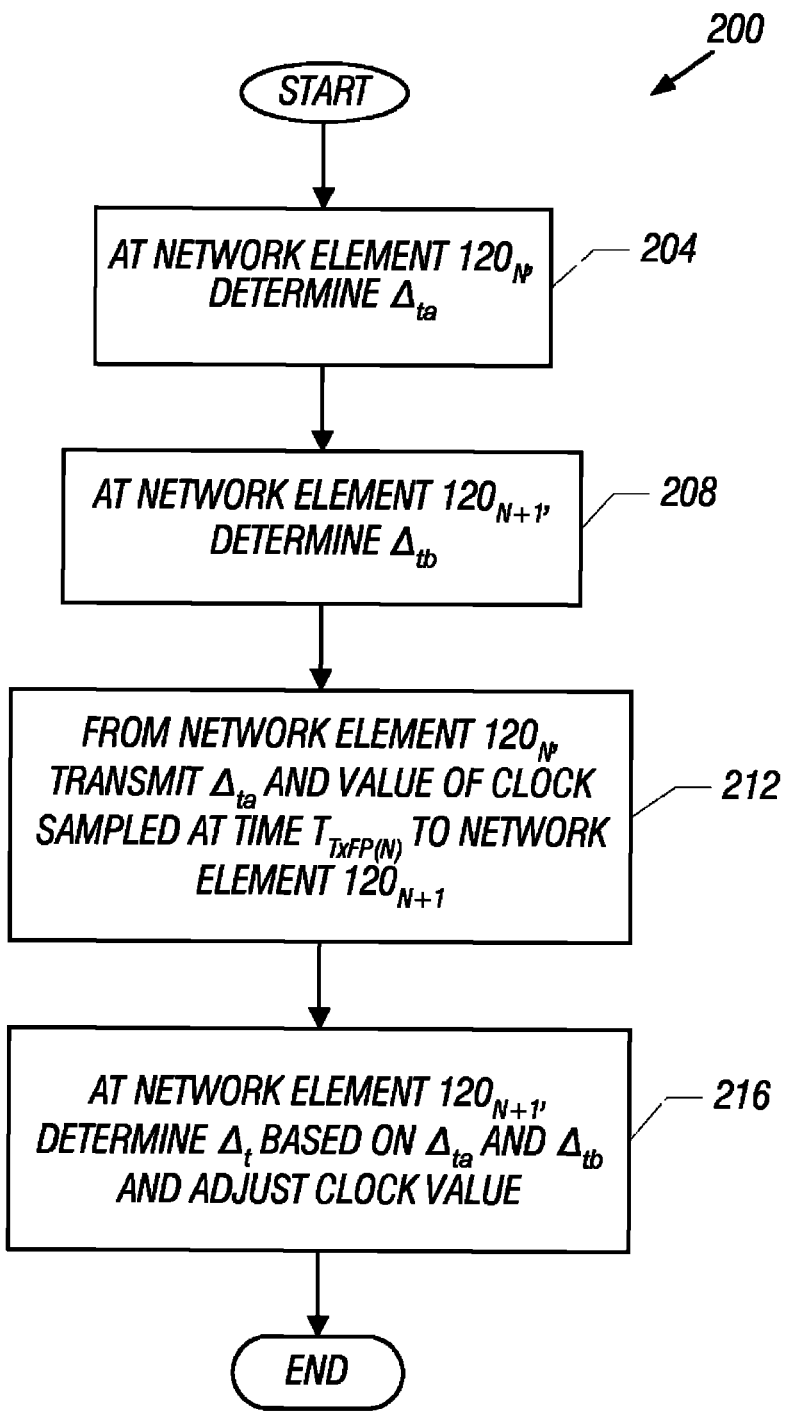
FIG. 4 is a flow diagram depicting a technique to distribute a clock among network elements of the network of FIG. 2 according to an embodiment of the invention.

As a more specific example, FIG. 4 depicts a technique 200 to distribute a reference clock from the network element $120_N$ to the network element $120_{N+1}$ in accordance with embodiments of the invention. First, according to the technique 200, the network elements $120_N$ and $120_{N+1}$ cooperate to determine the transmission delay $\Delta_t$. More specifically, the network element $120_N$ determines the $\Delta_{ta}$, pursuant to block 204, and the network element $120_{N+1}$ determines the $\Delta_{tb}$ value, pursuant to block 208. The network element $120_N$ then transmits the $\Delta_{ta}$ value and the value of the reference clock sampled at time $\tau_{T \times FP(N)}$ to the network element $120_{N+1}$. Based on the received $\Delta_{ta}$ value and the $\Delta_{tb}$ value that is calculated by the network element $120_{N+1}$, the network element $120_{N+1}$ determines the transmission delay $\Delta_t$. Based on the determined transmission delay $\Delta_t$ and the time $\tau_{T \times FP(N)}$, the network element $120_{N+1}$ adjusts the clock value provided by the network element $120_N$ to compensate for the transmission delay $\Delta_t$.

In accordance with some embodiments of the invention, the above-described values and quantities that are communicated over the network for purposes of determining the transmission delay and distributing the reference clock may be transmitted in an inband direct communications channel (DCC) of an SONET/SDH frame. By using the inband DCC channel, network traffic between the network elements 120 is not affected by the delay measurements and clock distribution.

Figure 5:
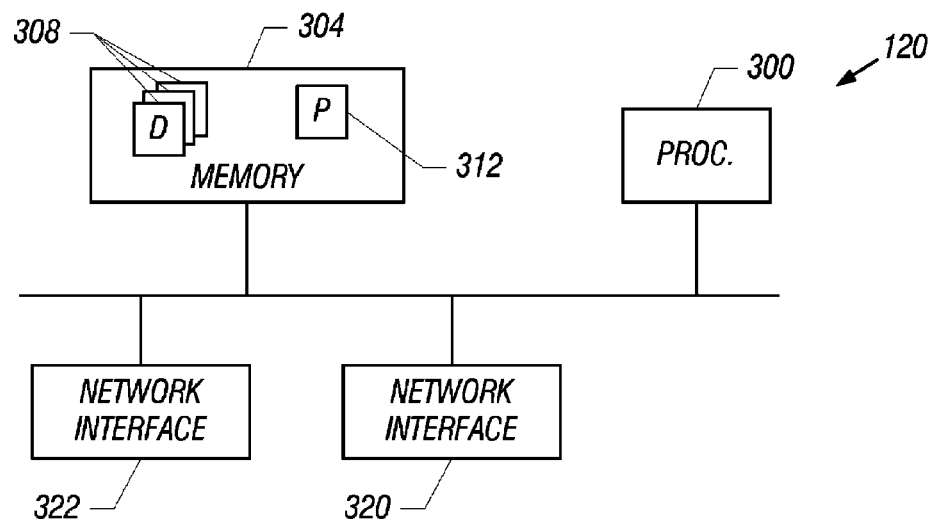
FIG. 5 is a schematic diagram of a network element of FIG. 2 according to an embodiment of the invention.

Referring to FIG. 5, in accordance with some embodiments of the invention, the network element 120 may have a general architecture that is depicted in FIG. 5. As an example, the network element 120 may include a processor 300, which represents one or more microprocessors and/or microcontrollers, as a non-limiting example. In general, the processor 300 executes program instructions 312 that are stored in a memory 304 of the network element 120. As examples, execution of the program instructions 312 by the processor 300 may cause the processor 300 to determine the $\Delta_{ta}$ or $\Delta_{tb}$ quantity, adjust a received reference clock value to account for transmission delay, determine a transmission delay, sample a reference clock, etc. In addition to the program instructions 312, the memory 304 may store various datasets 308, which are involved in the techniques that are described herein. As examples, the datasets 308 may involve initial, intermediate and/or final processing results, such as sampled reference clock values, frame pulse receipt times, frame pulse transmission times, compensated reference clock values, $\Delta_{ta}$ or $\Delta_{tb}$ times, determined transmission delay times, etc.

In addition to the memory 304 and the processor 300, the network element 120 may include various other components, such as, as a non-limiting example, a network interface 320 that communicates with the optical network. Additionally, the network element 120 may include another network interface 322 for purposes of communicating with the sensor network 140 (see FIG. 2). It is noted that many variations are contemplated and are within the scope of the appended claims.

Other embodiments of the invention are within the scope of the appended claims. For example, the systems and techniques that are described herein may likewise be applied to a seismic data acquisition system other than a towed system (a seabed cable-based seismic data acquisition system or a land-based seismic acquisition system, for example).

Furthermore, the systems and techniques that are disclosed herein may be applied to subterranean survey data acquisition systems other than seismic-based systems. For example, in accordance with other embodiments of the invention, the systems and techniques that are disclosed herein may be used in a controlled source electromagnetic (CSEM) survey system (as a non-limiting example) that uses electromagnetic sources and sensors rather than seismic sources and sensors. The CSEM system may be a towed or a seabed cable-based system.

As yet another variation, in accordance with some embodiments of the invention, the disclosed network and associated systems may be may be used on a source-disposed network. For example, the network may be distributed along the length of a seismic source. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    determining a first difference between a time that a first network element of a subterranean survey data acquisition network receives a first frame pulse from a second network element of the network and a time that the first network element transmits a second frame pulse to the second network element;
    determining a second difference between a time that the second network element receives the second frame pulse and a time that the second network element transmits the first frame pulse;
    determining a transmission delay between the first and second network elements based on the first and second differences, wherein determining the transmission delay comprises determining an average of the first and second differences; and
    distributing a real time clock over the network based on the determined transmission delay,
    wherein at least one of the determining the first difference, the determining the second difference and the determining the transmission delay is performed by a processor-based machine.

2. The method of claim 1, wherein the act of determining the transmission delay comprises communicating the first difference to the second network element and determining the transmission delay at the second network element based on the first and second differences.

3. The method of claim 1, wherein the act of determining the first difference occurs at the first network element and the act of determining the second difference occurs at the second network element.

4. The method of claim 1, further comprising:
    sampling a value of the real time clock at the first network element at the time that the first network transmits the second frame pulse to the network.

5. The method of claim 4, further comprising:
    communicating an indication of the value of the real time clock and an indication of the first difference to the second network element; and
    based on the second difference, the first difference and the value of the real time clock, determining a value of the real time clock at the second network element.

6. The method of claim 5, wherein the seismic data acquisition network comprises a synchronous optical network and the act of communicating the indication of the value of the real time clock and the indication of the first difference comprises communicating over an inband data communications channel.

7. The method of claim 1, further comprising:
    communicating acquired seismic measurements over the seismic data acquisition network.

8. The method of claim 1, further comprising:
    towing the first and second network elements on a streamer.

9. The method of claim 1, further comprising:
    determining a third difference between a time that the second network element receives a third frame pulse from a third network element of the seismic acquisition network and a time that the second network element transmits a fourth frame pulse to the third network element;
    determining a fourth difference between a time that the third network element receives the fourth frame pulse and a time that the third network element transmits the third frame pulse; and
    determining a transmission delay between the second and third network elements based on the third and fourth differences.

10. The method of claim 9, further comprising:
    communicating an indication of the value of the real time clock at the real time clock at the second network element and an indication of the third difference to the third network element; and
    based on the third difference, the fourth difference and the value of the real time clock at the second network element, determining a value of the real time clock at the third network element.

11. The method of claim 1, wherein the subterranean survey data acquisition network comprises a seismic data acquisition network.

12. The method of claim 1, further comprising timestamping data acquired by at least one of the first network element and the second network element using the real time clock.

13. An apparatus comprising:
    a subterranean survey data acquisition network comprising a first network element and a second network element; wherein
    the first network element is adapted to:
        determine a first difference between a time that the first network element receives a first frame pulse from the second network element and a time that the first network element transmits a second frame pulse to the second network element, and
        communicate an indication of the first difference to the second network element; and
    the second network element is adapted to:
        determine a second difference between a time that the second network element receives the second frame pulse and a time that the second network element transmits the first frame pulse,
        based on the second difference and the indication of the first difference communicated from the first network element, determine an average of the first and second differences to determine a transmission delay between the first and second network elements and adjust a distributed real time clock value based on the determined transmission delay.

14. The apparatus of claim 13, further comprising:
a towed seismic streamer, wherein the subterranean survey data acquisition network is disposed on the streamer.

15. The apparatus of claim 14, further comprising:
a vessel to tow the streamer.

16. The apparatus of claim 14, wherein the first network element is further adapted to sample a value of a real time clock at the time that the first network transmits the second frame pulse to the network.

17. The apparatus of claim 16, wherein the first network element is further adapted to communicate an indication of the value of the real time clock to the second network element.

18. The apparatus of claim 17, wherein the network comprises a synchronous optical network, and the second network element is adapted to communicate the indication of the value of the real time clock and the indication of the first difference over an inband data communications channel of the network.

19. The apparatus of claim 17, further comprising: seismic sensors coupled to the first and second network elements.

20. The apparatus of claim 17, wherein
the network further comprises a third network element; and
the second network element is further adapted to:
determine a third difference between a time that the second network element receives a third frame pulse from the third network element and a time that the second network element transmits a fourth frame pulse to the third network element; and
the third network element is adapted to:
determine a fourth difference between a time that the third network element receives the fourth frame pulse and a time that the third network element transmits the third frame pulse, and
determine a transmission delay between the second and third network elements based on the third and fourth differences.

21. The apparatus of claim 20, wherein
the second network element is further adapted to communicate an indication of the value of the real time clock at the real time clock at the second network element and an indication of the third difference to the third network element; and
the third network element is further adapted to based on the third difference, the fourth difference and the value of the real time clock at the second network element, determine a value of the real time clock at the third network element.

22. The apparatus of claim 13, wherein the subterranean survey data acquisition network comprises a seismic data acquisition network.

23. The apparatus of claim 13, wherein at least one of the first network element and the second network element is adapted to timestamp seismic measurements using the real time clock value.

* * * * *